US006462341B1

(12) United States Patent
Muehllehner

(10) Patent No.: US 6,462,341 B1
(45) Date of Patent: Oct. 8, 2002

(54) PIXELATED SCINTILLATION DETECTOR

(75) Inventor: Gerd Muehllehner, Wayne, PA (US)

(73) Assignee: ADAC Laboratories, Inc., Milipatas, CA (US)

( * ) Notice: Subject to any disclaimer, the term of this patent is extended or adjusted under 35 U.S.C. 154(b) by 0 days.

(21) Appl. No.: 09/489,212

(22) Filed: Jan. 21, 2000

(51) Int. Cl.$^7$ ................................................. G01T 1/20
(52) U.S. Cl. .................... 250/363.03; 250/366; 250/367
(58) Field of Search .................. 250/363.03, 363.04, 250/363.02, 363.01, 361 R, 366, 367, 368, 369

(56) References Cited

U.S. PATENT DOCUMENTS

| | | | |
|---|---|---|---|
| 3,774,032 A | * 11/1973 | Lange | 250/366 |
| 4,029,964 A | * 6/1977 | Ashe | 250/368 |
| 4,531,058 A | 7/1985 | Burnham et al. | |
| 4,605,856 A | * 8/1986 | Persyk et al. | 250/363.07 |
| 4,749,863 A | 6/1988 | Casey et al. | |
| 5,091,650 A | * 2/1992 | Uchida et al. | 250/366 |
| 5,118,948 A | * 6/1992 | Ito et al. | 250/369 |
| 5,132,539 A | * 7/1992 | Kwasnick et al. | 250/361 R |
| 5,319,204 A | * 6/1994 | Wong | 250/363.03 |
| 5,442,179 A | * 8/1995 | Ohishi | 250/366 |
| 5,753,917 A | * 5/1998 | Engdahl | 250/367 |
| 5,777,331 A | 7/1998 | Muehllehner | |
| 5,798,527 A | 8/1998 | Muehllehner et al. | |
| 5,969,358 A | * 10/1999 | DiFilippo et al. | 250/363.03 |

OTHER PUBLICATIONS

G.L. Brownell, "PCR–I—High Resolution Positron Tomograph Using Analog Coding" IEEE Transactions on Medical Imaging, vol. MI–3, No. 1, pp. 10–16, (Mar. 1984).

Wai–Hoi Wong, "A Positron Camera Detector Design with Cross–Coupled Scintallators and Quadrant Sharing Photomultipliers", IEEE Transactions on Nuclear Science, vol. 40, No. 4, pp. 962–966, (Aug. 1993).

Wai–Hoi Wong, "Front End Electronics for a Variable Field Pet Camera Using the PMT–Quadrant–Sharing Detector Array Desing," IEEE Transactions on Nuclear Science, vol. 44, No. 3, pp. 1291–1296, (Jun. 1997).

M.E. Casey, "A Multicrystal Two Dimensional BGO Detector System for Positron Emission Tomography" IEEE Transactions on Nuclear Science, vol. 33, No. 1, pp. 460–463, (Feb. 1986).

C.A. Burnham, "MGH Cylindrical Pet Detector Characteristics", Nuclear Science Symposium and Medical Imaging Conference, IEEE, vol. 3, pp. 1644–1647, (1991).

* cited by examiner

Primary Examiner—Constantine Hannaher
Assistant Examiner—Albert Gagliardi
(74) Attorney, Agent, or Firm—Akin, Gump, Strauss, Hauer & Feld, L.L.P.

(57) ABSTRACT

A positron emission detection scanner includes a first plurality of detecting elements arranged in a first two dimensional geometrical array, the detecting elements defining a first detection surface oriented for receiving radiant energy stimulus incident thereto. The detecting elements each have a second surface for communicating light from a scintillation event occurring in response to receiving a radiant energy stimulus. A light transmitting member is provided for receiving light from the scintillation events from each of the detecting elements. A second plurality of light sensing members is arranged in a second two dimensional geometrical array, different from the first geometrical array, the alignment of the light sensing members is independent of the detecting elements. A predetermined group of the light sensing members is responsive to light from said light transmitting member with each one of the light sensing members of the group producing signals proportional to its respective portion of the collected light.

23 Claims, 5 Drawing Sheets

PIXELATED SCINTILLATION DETECTOR

BACKGROUND OF THE INVENTION

The present invention relates to a positron emission tomography (PET) system, and more specifically, to a PET system for detecting positron emissions from a volume through a plurality of detecting elements arranged in a first two dimensional array about the volume, the first array being optically coupled to a plurality of light sensing members in a second two dimensional array so that a scintillation event created in a detecting element by a positron emission emanating from the volume is not necessarily identified as originating from an individual detecting element.

As is known, scintillation detectors used in nuclear medicine can be divided into two broad categories. The first category includes detectors which use one or a small number of large sized single scintillation crystals. The second category includes pixilated detectors employing a plurality of smaller sized crystals. In both categories, the detectors determine the position of a positron emission caused by decaying isotopes of a radioactive compound. The position of the positron emission is determined by calculating the locus of two oppositely directed gamma rays (i.e., 180° apart) impinging the detectors and causing scintillation events within the crystals. In this way, "coincident" scintillation events identify a unique position of a positron emission. Typically, the radioactive compound is administered to a subject for rendering a tomographic image whereby the biochemical and physiological condition of the subject can be monitored by way of the detector.

Devices which fall into the first category are the PET detectors generally used with nuclear medicine gamma cameras now in general use. These detectors use large sized crystals, typically NaI(TI), coupled to a large number of photomultipliers (PMTs). Identification of the situs of the positron emission is determined by "Anger" logic. Thus, the position of the scintillation event is calculated by complex processing circuitry using the signals from several PMTs (anywhere from 3 to 95) and using a centroid finding technique to determine the situs of the positron emission.

The second category, includes detectors with small scintillation crystals known as pixelated detectors. Pixelated scintillation detectors consist of a large number of small sized crystals in which the locus of a gamma ray impinging upon the detector is calculated by identifying the individual crystal in which the event was converted to light (the scintillation process). These detectors typically use small (4 by 8 mm) BismuthGermanate (BGO) crystals. Typically the crystals are grouped such that their outputs are received by a particular group of PMT's. Often referred to as "block" detectors due to their block like structure, the rectangular array of crystals are coupled to a corresponding rectangular array of PMTS. In general, pixelated scintillation detectors determine a position for every scintillation event and the events which are not coincident are eliminated after the individual crystals are identified, as such the processing circuitry for pixelated detectors is likewise complex and the spatial resolution of the detector is limited to the size of the individual crystals.

Presently, a pixelated PET detector is desired which uses many small crystals, but does not require an alignment of the crystals and the PMTs for identifying a scintillation event by a specific crystal. Further a pixelated PET detector is desired in which the processing electronics can be simplified to determine the coincidence of the scintillation event first and then the position of the positron emission causing the coincident event.

BRIEF SUMMARY OF THE INVENTION

Briefly stated, the present invention comprises a positron emission detection scanner. The scanner includes a first plurality of detecting elements arranged in a first two dimensional geometrical array, the detecting elements together defining a first detection surface oriented for receiving radiant energy stimulus incident thereto. The detecting elements each have a second surface for communication light from a scintillation event in response to receiving a radiant energy stimulus. A light transmitting member is provided for receiving light from the scintillation events from each of the detecting elements. A second plurality of light sensing members is arranged in a second two dimensional geometrical array, different from the first geometrical array. The alignment of the light sensing members is independent of the detecting elements, a predetermined group of light sensing members being responsive to light in the light transmitting member. The group of light sensing members collect the light from the light transmitting member and each one of the light sensing members of the group produce signals proportional to its respective portion of the collected light.

The present invention further comprises a positron emission scanner which includes a first plurality of detecting elements arranged in a first two dimensional geometrical array. The detecting elements together define a first detection surface oriented for receiving radiant energy stimulus incident thereto. The detecting elements each have a second surface for communicating light from a scintillation event in response to received energy stimulus. A light transmitting member is provided for receiving light from the scintillation events from each of the detecting elements. The light transmitting member has a detection surface and a transmission surface, the light transmitting member channeling light received by the detection surface by photon boundaries formed therein to distribute the light along photon paths such that the light is predictably distributed to exit the transmission surface. A second plurality of light sensing members is arranged in a second two dimensional geometrical array, the alignment of the light sensing members being independent of the detecting elements. In this manner, a predetermined group of light sensing members are responsive to light based on the distribution of the light in the light transmitting member and exiting the transmission surface. The group of light sensing members collect the light from the light transmitting member transmission surface such that each one of the light sensing members of the group produces electrical signals proportional to a collected portion of the received light.

The present invention further comprises a positron emission scanner including a first plurality of detecting elements arranged in a first two dimensional geometrical array. The detecting elements together define a first detection surface oriented for receiving radiant energy stimulus incident thereto and the detecting elements each having a second surface for communicating light from a scintillation event in response to receiving a radiant energy stimulus. A light transmitting member is provided for receiving the light from the scintillation events from each of the detecting elements. The light transmitting member has a detection surface and a transmission surface. The light transmitting member channels light received by the detection surface by photo boundaries formed therein to distribute the light along photo paths such that the light is predictably distributed to exit the transmission surface. A second plurality of light sensing members is arranged in a second two dimensional geometrical array not aligned to the first array, and oriented toward the light transmitting member transmission surface. Each light sensing member collects light through the light transmitting member from one or more of the detecting elements and generates proportional electrical signals. A processor is provided for receiving the electrical signals from each of the light sensing members and for determining the position of the energy stimulus.

The present invention further comprises a method of determining the coincidence of a scintillation event. The method comprises the steps of detecting positron emissions from an area with an array of detecting elements in a first two dimensional geometric configuration; transferring light from scintillation events in the array of detecting elements resulting from the detection of the positron emissions to a channeling member; collecting light from the channeling member with an array of light sensing members in a second two dimensional geometric configuration, the alignment of the light sensing members being independent of the detecting elements with each light sensing member producing electrical signals proportional to the portion of light passing thereto; and processing the light sensing member signals to identify coincident scintillation events.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
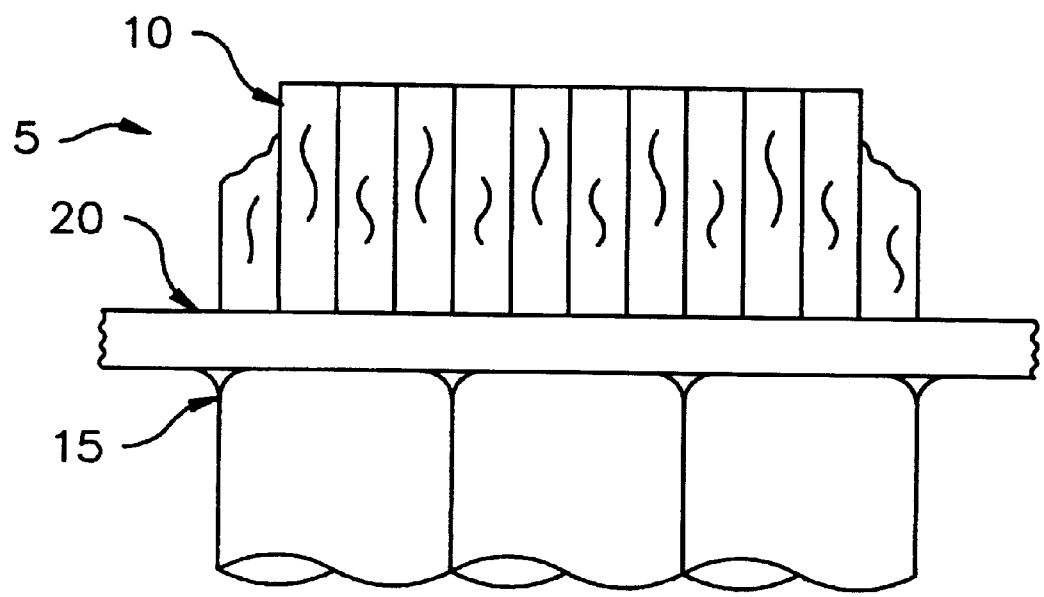
FIG. 1 is a side elevational view of a prior art pixelated positron emission scanner design.

Certain terminology is used in the following description for convenience only and is not limiting. The words "right," "left," "lower" and "upper" designate directions in the drawings to which reference is made. The words "inwardly" and "outwardly" refer to directions toward and away from, respectively, the geometric center of the pixelated scintillation detector and designated parts thereof. The terminology includes the words specifically mentioned above, derivatives thereof and words of similar import.

Figure 2:
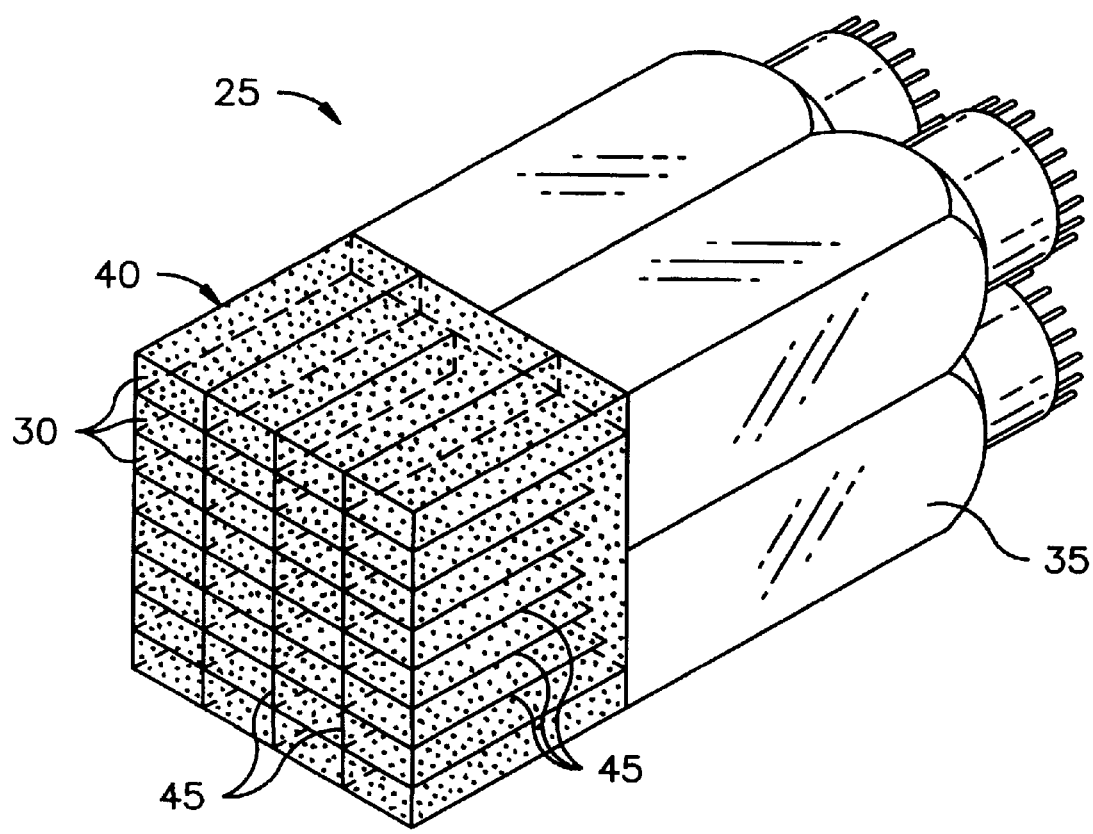
FIG. 2 is a perspective view of a prior art pixelated "block detector" positron emission detector design.
Figure 3:
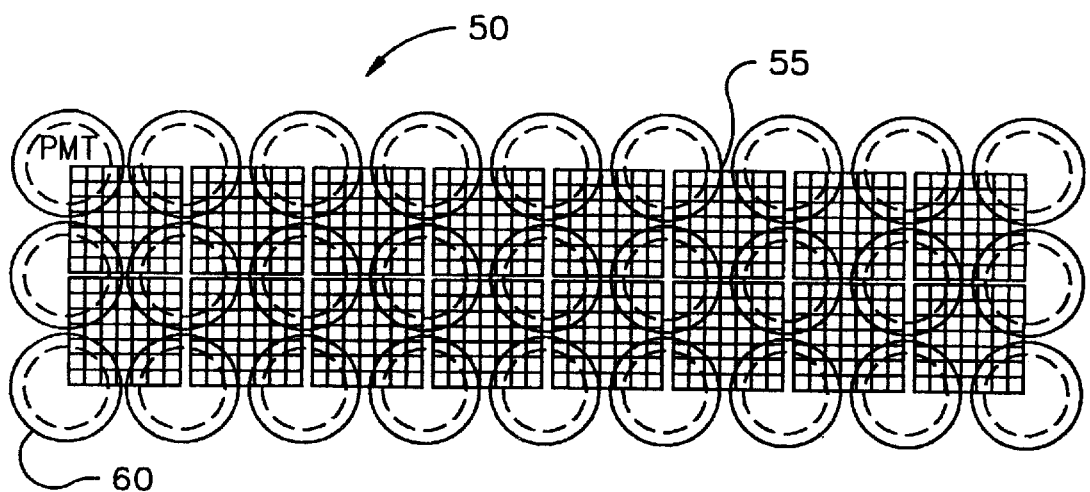
FIG. 3 is a schematic representation of a prior art pixelated quadrant sharing positron emission detector design.

Referring now to the drawings, FIGS. 1–3 show several prior art pixelated scintillation detectors. In FIG. 1, a pixelated scintillation detector 5 is formed from a one-dimensional, linear ring array of detector elements 10 and a hexagonal array of photomultiplier tubes (PMTs) 15 aligned with the array of detector elements 10. A light guide 20 provides mechanical support for both of the configurations of the PMTs 15 and the detector elements 10. The detector elements 10 of pixelated scintillation detector 5 are aligned relative to the PMTs 15, and are operably linked to processing electronics (not shown).

The processing circuitry provides one position calculation circuit for every 3 PMTS. In determining the position of a positron emission, first, the processing electronics identifies an individual element of the detector element array as the position for each detected scintillation event, then the circuitry eliminates all events not found to be in coincidence. In this way, the detector 5 detects an event by identifying a specific detecting element 10 of the linear array rather than by merely calculating the position of detected scintillation events.

Referring now to FIG. 2, a prior art pixelated scintillation detector 25 or "block detector" is shown. The block detector 25 includes a rectangular array of detecting elements 30 and a light guide 40 having photon boundaries 45 for predictably distributing photons traveling therethrough. Each group of four PMTs 35 form physically separate blocks (as opposed to the continuous light guide of FIG. 1). In this way, the block detector 25 distributes light among the PMTs 35 using the boundaries 45 of the light guide 40. As in FIG. 1, the detecting elements 30 are aligned relative to the PMTs 35. Thus, each "block" of 4 PMTs has its own position calculation circuit. Also as in the design of the pixelated scintillation detector of FIG. 1, the detector 25 identifies each individual detecting element receiving a gamma ray and a corresponding detecting element of the array of detecting elements 30 is identified for every event. The events which are not in coincidence are eliminated after the position calculation.

Referring to FIG. 3, a schematic diagram showing a modification of the block design of FIG. 2 is shown. A pixelated scintillation detector 50 includes cross-coupled detecting elements 55 and quadrant sharing PMTs 60. The detecting elements 55 are offset relative to the PMTs 60. However, the PMTs 60 and detecting elements 55 are still aligned. As with the detectors of FIGS. 1–2, the detector 50 of FIG. 3 similarly determines each of the individual detecting element of the array 55 which receives the gamma ray first and then determines the coincidence of the scintillation events.

Figure 4:
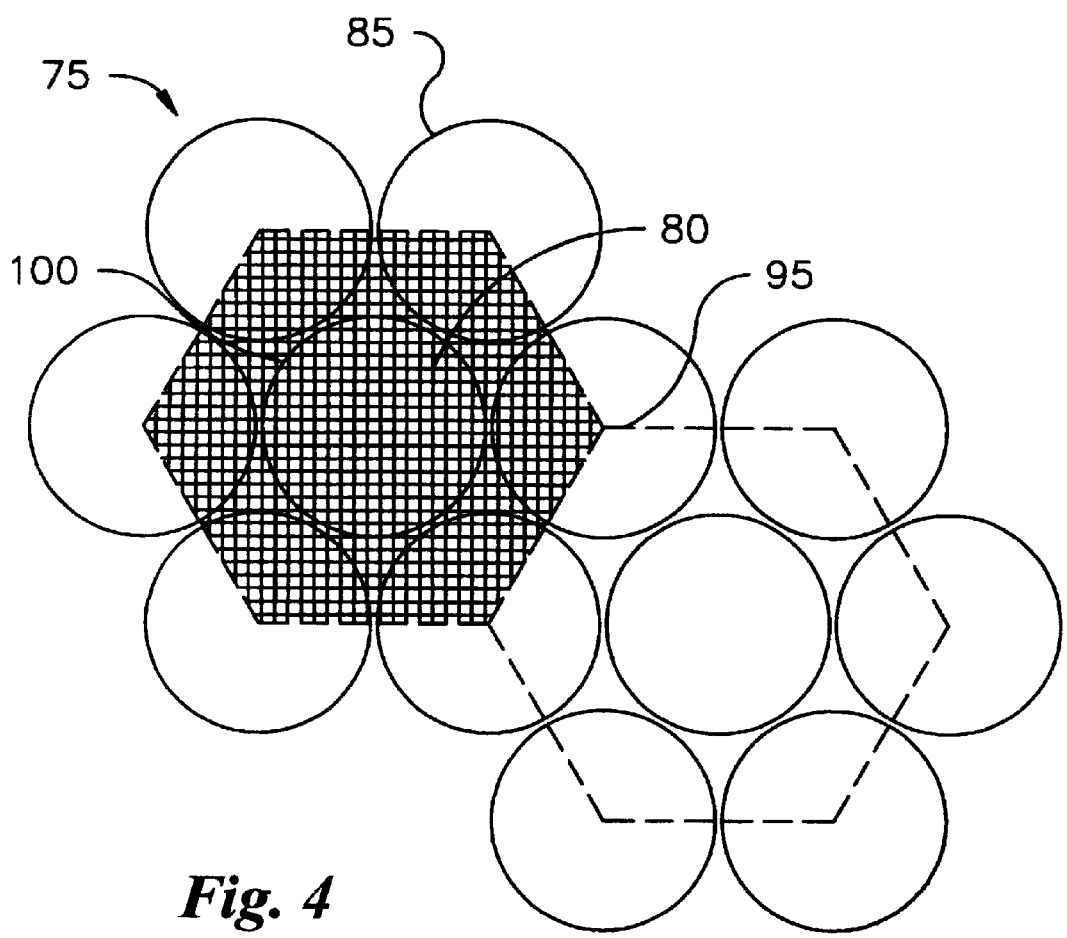
FIG. 4 is a schematic representation of a pixelated scintillation detector in accordance with the present invention.
Figure 5:
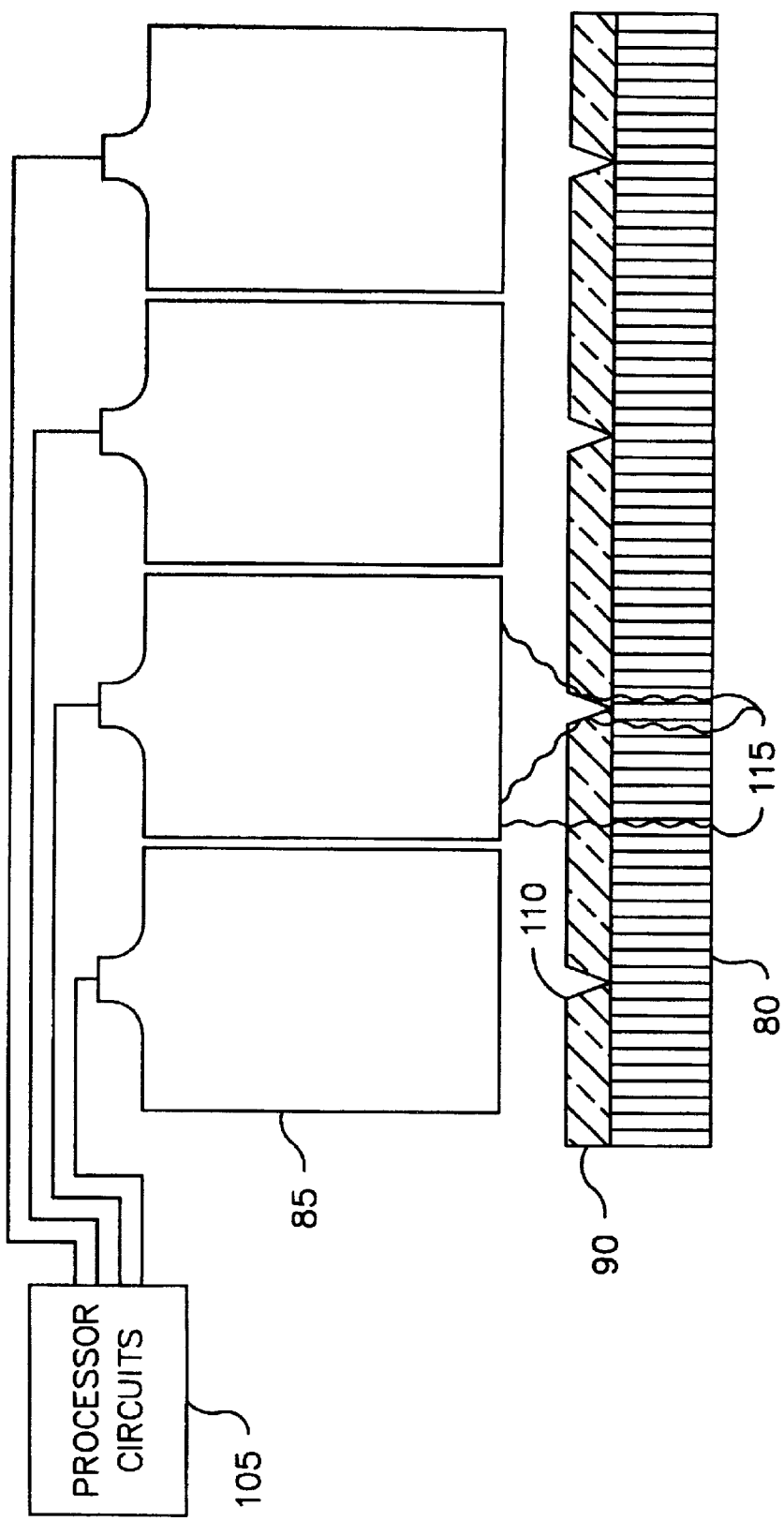
FIG. 5 is a side elevational view of the pixelated scintillation detector of FIG. 4 showing the boundaries of the light sensing member.

Referring now to FIGS. 4–5, schematic diagrams of a pixelated scintillation detector 75 in accordance with the present invention are shown. The detector 75 includes a first plurality of detecting elements or crystals 80, a second plurality of light sensing members or PMTs 85, and a light transmitting member 90 (shown in FIG. 5).

The first plurality of detecting elements 80 is arranged in a first two dimensional geometrical array 100, for receiving radiant energy stimulus. The detecting elements 80 each communicate light from a scintillation event in response to receiving a radiant energy stimulus such as a gamma ray. The array 100 includes many small detecting elements 80, preferably NaI(Tl), GSO, LSO or LGSO crystals. The detecting elements 80 are attached either to a flat or curved light transmitting member 90. The size of the member 90 can range from 10 cm long by 10 cm wide containing 625 individual detecting elements 80, to a cylindrical light transmitting member with a 90 cm diameter and 25 cm length containing about 30,000 detecting elements 80. As can be appreciated, a single light transmitting member or multiple members 90 may be employed by the detector 75.

The light transmitting member 90 receives light resulting from scintillation events from each of the detecting elements 80 in the first geometrical configuration 100. A second geometrical array 95 of light sensing elements or "PMT's" 85 are optically coupled to the light transmitting member 90 in an arrangement which is not related to the position or geometry of the detecting elements 80. For example, as shown in FIG. 4, the detecting elements 80 are arranged in a square array 100 of 5 mm long by 5 mm wide. The array 100 of detecting elements 80 is optically coupled to a hexagonal array 95 of cylindrical light sensing members 85 by way of the light transmitting member 90, where each light sensing member 85 has a typical diameter of 38 mm. The light transmitting member 90 is preferably manufactured of Lucite™ or some other transparent, lightweight polymeric material, however other materials are known to those skilled in the art. By way of example, the 38 mm diameter PMTs 85 may be arranged in a close-packed hexagonal pattern such that the separation from the center-to-center spacing of rows of PMTs 85 in a first direction (x) is 40 mm. This necessarily results in a separation of 35 mm between rows of PMTs 85 in the other direction (y) perpendicular to first direction (x). Again, by way of example it may be desirable to use detecting elements 80 with dimensions of 4×4 mm square. Thus it is obvious that the detecting elements 80 will be aligned with the PMTs 85 in one direction (i.e. 10 crystals per PMT), but will not be aligned with the PMTs 85 in the other direction (i.e. 8.75 crystals per PMT).

Specifically, by not aligning the array 95 of light sensing members or PMTs 85 with the array 100 of detecting elements 80, the design of the PET scanner can be optimized to achieve a desired performance not possible by requiring an alignment. Furthermore, the design allows as few as two processing circuits (not shown) to determine the position of an event within the detector element array 100, instead of requiring a large number of processing circuits as is customarily used with prior art block detectors as described above.

Referring now more specifically to FIG. 5, the light transmitting member 90 is shown including photon boundaries 110 for channeling photons 115 along predetermined paths for reducing the number of light sensing members 85 necessary to detect a scintillation event. In the prior art block detector 25 shown in FIG. 2, there are physical boundaries, such as grooves of different depths, which are all aligned relative to the detecting elements 30. Likewise, the present invention employs physical boundaries 110 to redirect the light from the detecting elements 80. However, the boundaries 110 of the detector 75 of the present invention are employed to be aligned relative to the light sensing members 85. For example, in the hexagonal array 95 of light sensing members 85 shown in FIG. 4, the pattern of physical boundaries 110 formed in the light sensing member 90 also forms a hexagonal pattern, even though the detecting elements 80 might be arranged in a square array. The boundaries 110 reduce the distance over which the light from the detecting elements 80 spreads within the light transmitting member 90 and redirects the light in such a way that accurate positioning of the event can be achieved with fewer, larger PMTs. For example, it may be possible to replace the PMTs having a diameter of 38 mm with PMTs having a diameter of 45 mm, thereby reducing the total number of PMTs required.

The physical boundaries 110 may be formed in patterns wherein the channel walls slope to converge at a vertex for creating a triangular channel. In this way, light is redirected by the sloping channel walls as shown in FIG. 5. It is recognized by those skilled in the art that a variety of geometrical channel configurations are possible for performing this function. Additionally, boundaries 110 aligned relative to the light sensing members 85 can be formed to have channel widths corresponding to the distance between the light sensing members 85. In this way, light is redirected away from areas where detection of light is minimal due to a specific geometrical configuration of light sensing members 85.

The second geometrical array 95 of light sensing members 85 is arranged in a geometrical configuration different from the first geometrical array 100 of the detection elements 80. The alignment of the light sensing members 85 is independent of the detecting elements 80 so that a square array of detecting elements 80 may be combined with a close-packed hexagonal array of round PMTs 85. The group of light sensing members 85 collect the light from the light transmitting member 90, and each one of the light sensing members 85 of the second geometrical configuration 95 produces electrical signals proportional to its respective portion of the collected light. A predetermined group of the plurality of light sensing members 85 is responsive to light in the light transmitting member 90.

For example, it may be useful in the center of the array of detecting elements 80 to use seven PMTs 85 to calculate the position of the event, while it may only be necessary to use three PMTs 85 to calculate the position of the event along the edges of the array of detecting elements 80.

The detector 75 is operably linked to processor circuits 105 normally used with continuous scintillation crystals. The processor circuits first determine the coincidence and then determines the position of an event only for those events which are actually in coincidence (typically only 2–3% of all events are in coincidence, therefore the data rate for position calculation is dramatically reduced). The processor circuits do not necessarily identify individual crystals, only general areas of the array. The position of the positron emission event is calculated and repositioned based on a calibration table. This method is well known in standard nuclear medicine gamma cameras and is referred to as either "distortion removal" or "linearity correction". Thus an individual detecting element 80 is not identified by the detector 75 for determining the position of a positron emission. In this way, the size of the detecting elements 80 does not limit the spatial resolution of the detector 75.

The processor circuits first determine whether two events are in coincidence. If they are found to be in coincidence, the PMT values are transferred to another circuit which next finds the PMT 85 with the largest signal. The processor circuits next use the signals from three to seven of the PMTs in the vicinity of the PMT with the largest signal to calculate the position of the coincident event within the array of detecting elements 80. Finally, the total amount of signal detected is used to accept those coincident events within a predetermined total signal range, which range may be a function of the position on the array of detecting elements 80, where the position of the event has been calculated.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the invention as defined by the claims.

What is claimed is:

1. A positron emission detection scanner, comprising:
   a first plurality of detecting elements arranged in a first two dimensional geometrical array, said detecting elements defining a first detection surface oriented for receiving radiant energy stimulus incident thereto, each of said detecting elements having a second surface for communicating light from a scintillation event occurring within each of said detector elements in response to receiving a radiant energy stimulus;

a light transmitting member for receiving the light from each of said detecting elements; and a second plurality of light sensing members arranged in a second two dimensional geometrical array, different from the first geometrical array the light sensing members of the second geometrical array being unaligned with the detecting elements of the first geometrical array, a predetermined group of said plurality of light sensing members being responsive to light in said light transmitting member, the group of light sensing members collecting the light from said light transmitting member, and each one of the light sensing members of said group producing signals proportional to its respective portion of the collected light.

2. The positron emission detection scanner of claim 1 further comprising:

at least one processor circuit for receiving the electrical signals from the group of light sensing members to determine the coincidence of the scintillation events and, for those scintillation events in coincidence, determining the position of each of the radiant energy stimulus.

3. The positron emission detection scanner of claim 2 wherein the detecting elements are arranged in a rectangular array.

4. The positron emission detection scanner of claim 1 wherein the groups of light sensing members are arranged in a hexagonal array.

5. The positron emission detection scanner of claim 1 wherein the position of a scintillation event is not recorded as originating from an individual detecting element.

6. A positron emission detection scanner, comprising:

a first plurality of detecting elements arranged in a first two dimensional geometrical array, said detecting elements defining a first detection surface oriented for receiving radiant energy stimulus incident thereto, said detecting elements each having a second surface for communicating light from a scintillation event occurring in response to receiving a radiant energy stimulus;

a light transmitting member for receiving light from the scintillation events from each of said detecting elements, the light transmitting member having a detection surface and a transmission surface, the light transmitting member channeling light incident to the detection surface by photon boundaries formed therein to distribute the light along photon paths such that the light is predictably distributed to exit the transmission surface; and a second plurality of light sensing members arranged in a second two dimensional geometrical array, the light sensing members of the second geometrical array being unaligned with the detecting elements of the first geometrical array, wherein a predetermined group of said plurality of light sensing members are responsive to light based on the distribution of the light in said light transmitting member and exiting the transmitting surface, the group of light sensing members collecting the light from said light transmitting member transmission surface, each one of the light sensing members of said group producing electrical signals proportional to a collected portion of the received light.

7. The positron emission detection scanner of claim 6 wherein the position of the scintillation event is not necessarily identified as originating from an individual detecting element.

8. The positron emission detection scanner of claim 6, further comprising:

at least one processor circuit for receiving the electrical signals from the group of light sensing members for determining the coincidence of the scintillation events and, for those scintillation events in coincidence, determining the position of the radiant energy stimulus.

9. The positron emission detection scanner of claim 6, wherein the photon boundaries of the light transmitting member are formed in a predetermined pattern by cutting channels in the transmission surface of the light transmitting member.

10. The positron emission detection scanner of claim 9, wherein the channel depth is triangularly cut such that sloping channel walls terminate at a vertex facing the detection surface.

11. The positron emission detection scanner of claim 10 wherein the width of the channels on the transmission surface corresponds to the spacing distance between the individual members of the second plurality of light sensing members.

12. The positron emission detector of claim 10 wherein channel patterns are formed in the geometrical pattern of the light sensing members and are aligned therewith.

13. A positron emission detection scanner, comprising:

a first plurality of detecting elements arranged in a first two dimensional geometrical array, said detecting elements defining a first detection surface oriented for receiving radiant energy stimulus incident thereto, said detecting elements each having a second surface for communicating light from a scintillation event occurring in response to receiving a radiant energy stimulus;

a light transmitting member for receiving the light from the scintillation events from each of said detecting elements, the light transmitting member having a detection surface and a transmission surface, the light transmitting member channeling light incident to the detection surface by photon boundaries formed therein to distribute the light along photon paths such that the light is predictably distributed to exit the transmission surface;

a second plurality of light sensing members arranged in a second two dimensional geometrical array not aligned to the first array, and oriented toward the light transmitting member transmission surface, each light sensing member collecting light through said light transmitting member from one or more of said detecting elements and for generating proportional electrical signals; and a processor circuit for receiving the electrical signals from each of the light sensing members and for determining the position of the radiant energy stimulus.

14. The positron emission detection scanner of claim 13 wherein the position of the radiant energy stimulus is calculated only upon identification of a coincident event.

15. The positron emission detection scanner of claim 13 wherein the light sensing members are photomultipliers.

16. The positron emission detection scanner of claim 13 wherein the detecting elements are crystals.

17. The positron emission detection scanner of claim 16 wherein the crystals are between 4 and 5 millimeters in width.

18. A method of determining the coincidence of a scintillation event comprising the steps of:

detecting positron emissions from a volume with an array of detecting elements in a first two dimensional geometric configuration;

transferring light from scintillation events occurring in the detecting elements resulting from the detection of the positron emissions to a channeling member;

collecting light from the channeling member with an array of light sensing members in a second two dimensional geometric configuration, the light sensing members of the second geometrical array being unaligned with the detecting elements of the first geometrical array, each light sensing member producing electrical signals proportional to the portion of light passed thereto; and processing the electrical signals of the light sensing members to identify coincident scintillation events.

19. The method of determining the coincidence of scintillation events of claim 18 further comprising:

segregating the light in the channeling member by photon boundaries arranged in a predetermined pattern.

20. The method of determining the coincidence of scintillation events of claim 19 wherein the photon boundary pattern corresponds to the second two dimensional geometrical configuration of the light sensing member array and is aligned therewith.

21. The method of determining the coincidence of scintillation events of claim 18 wherein the position of a scintillation event is not identified as originating from an individual detecting element.

22. A method of determining the coincidence of a scintillation event comprising the steps of:

detecting positron emissions from a volume with an array of detecting elements in a first two dimensional geometric configuration;

transferring light from scintillation events occurring in the detecting elements and resulting from the detection of the positron emissions to a channeling member;

segregating the light in the channeling member using photon boundaries arranged in a predetermined pattern;

collecting segregated light from the channeling member with an array of light sensing members in a second two dimensional geometric configuration aligned with the photon boundaries, the light sensing members of the second geometrical array being unaligned with the detecting elements of the first geometrical array, each light sensing member producing electrical signals proportional to the portion of segregated light passed thereto;

processing the light sensing member signals to identify coincident scintillation events; and identifying the situs of the positron emission causing the coincident scintillation events.

23. The method of determining the coincidence of a scintillation event of claim 22 wherein the position of a scintillation event is not identified as originating from an individual detecting element.

* * * * *